(12) United States Patent
Riemann

(10) Patent No.: US 11,491,547 B2
(45) Date of Patent: Nov. 8, 2022

(54) SURFACE NORMAL CONTROL FOR ADDITIVE MANUFACTURING

(71) Applicant: FORMALLOY TECHNOLOGIES, INC., Spring Valley, CA (US)

(72) Inventor: Jeffrey L. Riemann, Spring Valley, CA (US)

(73) Assignee: FormAlloy Technologies, Inc., Spring Valley, CA (US)

( * ) Notice: Subject to any disclaimer, the term of this patent is extended or adjusted under 35 U.S.C. 154(b) by 164 days.

(21) Appl. No.: 17/141,002

(22) Filed: Jan. 4, 2021

(65) Prior Publication Data

US 2022/0212262 A1 Jul. 7, 2022

(51) Int. Cl.

| | |
|---|---|
| *B22F 10/85* | (2021.01) |
| *B22F 12/33* | (2021.01) |
| *B33Y 30/00* | (2015.01) |
| *B22F 10/30* | (2021.01) |
| *B22F 12/53* | (2021.01) |
| *B33Y 10/00* | (2015.01) |
| *B22F 12/37* | (2021.01) |
| *B33Y 50/02* | (2015.01) |

(52) U.S. Cl.
CPC .............. *B22F 10/85* (2021.01); *B22F 10/30* (2021.01); *B22F 12/33* (2021.01); *B22F 12/37* (2021.01); *B22F 12/53* (2021.01); *B33Y 10/00* (2014.12); *B33Y 30/00* (2014.12); *B33Y 50/02* (2014.12)

(58) Field of Classification Search
CPC .......... B22F 10/85; B22F 10/30; B22F 12/33; B22F 12/37; B22F 12/53; B33Y 10/00; B33Y 30/00; B33Y 50/02
USPC .......................................................... 700/119
See application file for complete search history.

(56) References Cited

U.S. PATENT DOCUMENTS

2012/0298633 A1 11/2012 Riemann et al.
2018/0326660 A1\* 11/2018 Gifford ................ B29C 64/241

\* cited by examiner

*Primary Examiner* — Michael J Brown
(74) *Attorney, Agent, or Firm* — Dinsmore & Shohl, LLP

(57) ABSTRACT

Aspects described herein provide a method including: receiving layer data for a part to be additively manufactured, wherein the layer data comprises a plurality of deposition locations; for each respective deposition location of the plurality of deposition locations: determining a surface normal vector for with the respective deposition location; determining a direction of travel vector based on the respective deposition location and at least one other deposition location of the plurality of deposition locations; determining a tool vector for the respective deposition location based on the direction of travel vector for the respective deposition location and the surface normal vector for with the respective deposition location; manipulating a movable element of the additive manufacturing machine to align with the tool vector for the respective deposition location; and depositing material of the part at the respective deposition location.

20 Claims, 7 Drawing Sheets

SURFACE NORMAL CONTROL FOR ADDITIVE MANUFACTURING

INTRODUCTION

The present disclosure relates to additive manufacturing systems and methods, and in particular, to systems and methods for performing additive manufacturing according to a surface normal reference on the part being manufactured.

Unsupported overhangs are notoriously problematic for additive manufacturing systems without an integral support structure. Additive manufacturing systems with an integral support structure include, for example, powder bed technologies, wherein a layer of powder is added into an enclosed area and then solidified in some manner. In such systems, the powder bed serves as a support structure. Additive manufacturing systems without an integral support structure include, for example, directed energy deposition systems wherein a feedstock (typically powder or wire) is deposited via a directed energy source, such as a laser, electron beam, or plasma, in a "line of sight" manner.

Directed energy deposition systems are generally advantageous compared with powder bed systems due to processing speed, material efficiency, and flexibility of manufacturing applications, to name a few advantages. However, conventional directed energy deposition systems are limited in their ability to address unsupported overhangs.

Accordingly, what are needed are additive manufacturing systems and methods that address the overhang problem when using directed energy deposition additive manufacturing techniques.

BRIEF SUMMARY

Aspects described herein provide a method for operating an additive manufacturing machine, including: receiving layer data for a part to be additively manufactured, wherein the layer data comprises a plurality of deposition locations; for each respective deposition location of the plurality of deposition locations: determining a surface normal vector for with the respective deposition location; determining a direction of travel vector based on the respective deposition location and at least one other deposition location of the plurality of deposition locations; determining a tool vector for the respective deposition location based on the direction of travel vector for the respective deposition location and the surface normal vector for with the respective deposition location; manipulating a movable element of the additive manufacturing machine to align with the tool vector for the respective deposition location; and depositing material of the part at the respective deposition location.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
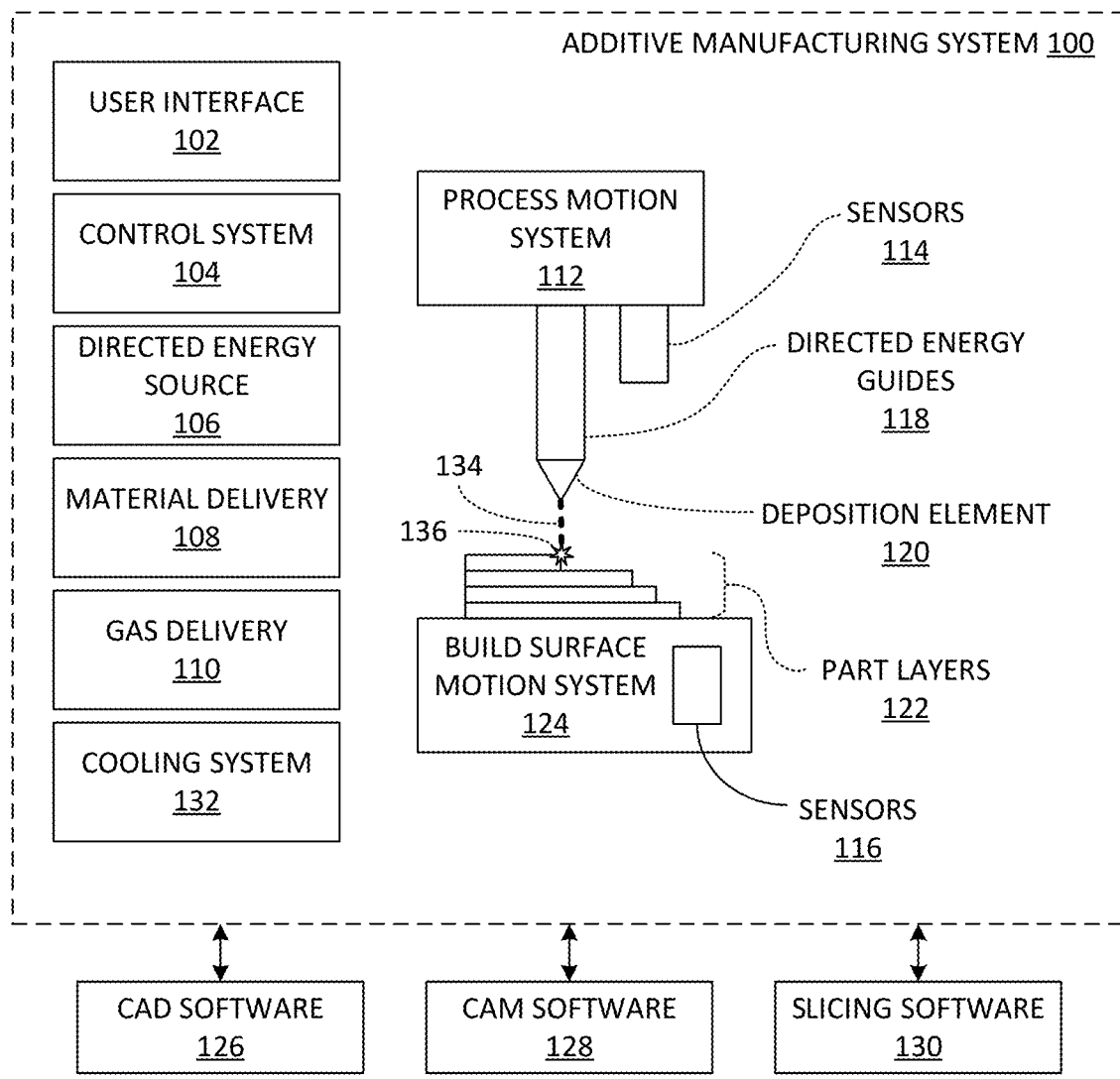
FIG. 1 depicts an example of an additive manufacturing system.

Aspects of the present disclosure provide systems and methods for performing additive manufacturing according to a surface normal reference, and in particular for creating multi-axis tool paths that follow a surface normal reference on the part being manufactured.

As above, unsupported overhangs represent a significant challenge for building certain part geometries using directed energy deposition techniques. Generally, directed energy deposition machines may be limited to building structures with overhangs angled less than 30 degrees with respect to a vertical axis without changing the orientation of the build surface and/or the deposition element of the machine. A conventional solution to this problem is to build temporary structures to support part overhangs as the part is being built, but this approach comes with significant compromises. For example, building the support structures require additional material, additional time, and additional post processing to remove the support material, which can reduce surface quality and even damage the part.

To counter the unsupported overhang problem, directed energy deposition systems may employ multi-axis (e.g., 4, 5, and 6-axis) motion systems to change the deposition element and/or the part orientation (e.g., by way of a movable build surface) such that the directed energy and the feedstock (e.g., wire or powder) are directed in a manner that minimizes the effect of the overhang.

While conceptually straightforward, creating multi-axis toolpaths that constantly change the orientation of the deposition element and/or part is complex and not implemented by conventional manufacturing software. Note that "multi-axis" may generally refer to multiple degrees of freedom, including degrees of freedom in position/translation axes (e.g., X, Y, and Z Cartesian axes) as well as orientation/ rotation axes (e.g., rotation about the X, Y, and Z axes, sometimes referred to as the A, B, and C axes, respectively).

To overcome the shortcomings of conventional approaches, embodiments described herein provide methods for determining multi-axis toolpaths that follow a surface normal reference on the part being built, and which may be referred to as "surface normal following" methods. In particular, the surface normal following methods described herein may generate toolpaths that maintain an orientation (or pose) of a deposition element that is perpendicular to the surface normal vector of the part and perpendicular to a direction of travel vector of the deposition element, such as depicted and described with respect to FIG. 3. The methods described herein vastly reduce the difficulty, time, and complexity of generating multi-axis toolpaths for additively manufacturing parts with unsupported overhangs, such as by directed energy deposition.

In some embodiments, the multi-axis toolpaths generated according to the surface normal following methods described herein beneficially do not need to change the orientation of the part, only the deposition element, which thereby reduces the complexity of generating such toolpaths. Further, in such embodiments, the part shape, mass, and location on a build surface (e.g., a substrate) do not impact the ability of the additive manufacturing machine to build the part since the deposition element changes orientation while the part is fixed.

In some embodiments, the additive manufacturing machine may be configured to generate the surface normal following multi-axis toolpaths based on conventional part layer data (e.g., "slice" data), which beneficially allows existing computer aided manufacturing (CAM) and slicing software to be used without modification. In particular, the existing CAM and slicing software need not be configured to generate orientation (or rotation) commands, and need not be programmed with the kinematics of the additive manufacturing machine. Thus, the methods described herein are widely applicable to different types of additive manufacturing machines that rely on layered (or sliced) part data.

For example, an additive manufacturing machine may be configured to determine surface normal vectors for locations along a part layer based on position coordinates (e.g., X, Y, and Z) in the layer data provided by the CAM or slicing software. The additive manufacturing machine may further be configured to determine direction of travel vectors based on the position coordinates in the layer data, such as the direction indicated by traversing from one position to the next in the layer data. Finally, based on the surface normal vector and the direction of travel vector for any given position in the layer data, the additive manufacturing machine may further determine a tool vector for optimally positioning the deposition element with respect to the part layer at a given position in the layer data. Given the tool vector, the additive manufacturing machine may then perform a kinematic transformation based on the mechanical implementation of the additive manufacturing machine in order to properly align a deposition element with the tool vector. As this process is repeated over many positions in a layer data, a surface normal following multi-axis toolpath is generated.

In some embodiments, surface normal vectors may be generated by the CAM or slicing software and provided to the additive manufacturing machine, wherein the remainder of the method is performed as described above. In other words, in such embodiments, the additive manufacturing machine may only need to determine the direction of travel vectors and tool vectors to generate the surface normal following multi-axis toolpaths.

Example Additive Manufacturing System

FIG. 1 depicts an example of an additive manufacturing system 100.

In this example, additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a server computer, desktop or laptop computer, or a personal electronic device, such as a smartphone, tablet computer, or a smart wearable device, to name a few examples).

Additive manufacturing system 100 also includes a control system 104. In this example, control system 104 is in data communication with user interface 102 as well as directed energy source 106, material delivery system 108, gas delivery system 110, process motion system 112, sensors 114, sensors 116, build surface motion system 124, and cooling system 132. In other examples, control system 104 may be in data communication with further elements of additive manufacturing system 100, which are not depicted in this example. Further, in other examples, control system 104 may be in data communication with fewer elements of additive manufacturing system 100, such as where another embodiment of an additive manufacturing system includes fewer elements compared to the example of FIG. 1.

Control system 104 may include hardware and software for controlling various aspects of additive manufacturing system 100. For example, control system 104 may include one or more processors, memories, data storages, physical interfaces, software interfaces, software programs, firmwares, and other aspects in order to coordinate and control the various elements of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, microcontroller, field programmable gate array (FPGA), or the like, while in other examples control system 104 may be implemented by a general purpose computer with specific software components for controlling the various aspects of additive manufacturing system 100.

Control system 104 may generally interpret commands received from user interface 102 and thereafter cause appropriate control signals to be transmitted to other aspects of additive manufacturing system 100. For example, a user may input data representing a part to be processed using additive manufacturing system 100 into user interface 102 and control system 104 may act upon that input to cause additive manufacturing system 100 to process the part.

In some examples, control system 104 may compile and execute machine control codes, such as G-code data, that causes aspects of additive manufacturing machine 100 to operate. For example, the machine control codes may cause process motion system 112 or build surface motion system 124 to move to specific positions and at specific speeds. As another example, the machine control codes may cause directed energy source 106, material delivery system 108, gas delivery system 110, or cooling system 132 to activate or deactivate at specific times, locations, or based on specific conditions, such as operating conditions, sensor readings, and the like. Further, the machine control codes may modulate the operation (e.g., via a settable operational parameter) of the aforementioned aspects of additive manufacturing machine 100, such as by increasing or decreasing the power of directed energy source 106, increasing or decreasing the flow rate of material delivery system 108 or gas delivery system 110, increasing or decreasing amount of cooling by cooling system 132, etc., based on time, location, and/or conditions, such as operating conditions, sensor readings, and the like.

Process motion system 112 may move elements of additive manufacturing system 100 to specified positions. For example, process motion system 112 may position deposition element 120 at a specified distance from a part layer 122 being manufactured, or move deposition element 120 along a preprogrammed path to build up a three-dimensional part.

Additive manufacturing system 100 may include various sensors to monitor and to help control aspects of a manufacturing process through active feedback. In some embodiments, sensors 114 may be connected to process motion system 112 such that the sensors are configured to move with process motion system 112. For example, sensors 114 may include one or more temperature sensor, distance sensors, optical sensors (e.g., camera or video sensors), each of which may be configured to provide operational data during processing by additive manufacturing system 100. For example, temperature sensors may provide point temperature measurements, temperature gradients, heat maps, etc.

In some embodiments, a temperature sensor of sensors 114 may be any sort of sensor capable of measuring temperature to an object. In some examples, the temperature sensor 114 may include a contact-based sensor, such as a thermocouple, while in others, the temperature sensor may be a contact-less sensor, such as a photo or laser-based sensor. One or more temperature sensors may provide various types of temperature data back to control system 104, for example, to provide data for control of directed energy source 106, gas delivery system 110, and cooling system 132 to enable closed-loop control of directed actively cooled gas flows.

In some embodiments, sensors 114 may include various forms of optical sensors (e.g., image and/or camera sensors), such as a visible spectrum optical sensor, or a non-visible spectrum (e.g., infrared) optical sensor. In some examples, the same sensor may be able to provide data in multiple spectrums. Further, additive manufacturing system 100 may include optics that allow for directing, changing (e.g., zoom), and focusing a field of view of an optical sensor. Optical sensors may generally provide various types of image data, including infrared heat data, back to control system 104, for example, to provide data for control of directed energy source 106, gas delivery system 110, and cooling system 132 to enable closed-loop control of directed actively cooled gas flows. For example, an infrared-based optical sensors (e.g., an infrared image sensor) may be used to view heat distributions and gradients in part layers 122. As another example, an infrared-based optical sensor may be used to measure process area (e.g., melt pool) size, position, geometry, and the like.

In some embodiments, various sensors, such as image sensors and contactless temperature and distance sensors, may be configured to have coaxial "views" of an active processing area 136, such as a melt pool created by deposition element 120. For example, a boresight camera or other sensor may be configured with optics that allow for "looking" down the directed energy axis (e.g., axis of beam 134) towards the part being manufactured, such as by using turning mirrors, one-way mirrors, and other optical elements.

Directed energy source 106 may provide any suitable form of directed energy, such as a laser beam (e.g., from a fiber laser) or an electron beam generator, which is capable of melting a manufacturing material, such as a metal powder. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a directed energy beam (e.g., laser beam) at a specific focal point (e.g., active processing area 136) and to control the size of the focal point. In this way, the actual creation of the directed energy beam by directed energy source 106 may be located remote from the manipulation and focusing of the directed energy by directed energy guides 118.

In some embodiments, directed energy source 106 may also be used to remove material from a manufactured part, such as by ablation.

Figure 2:
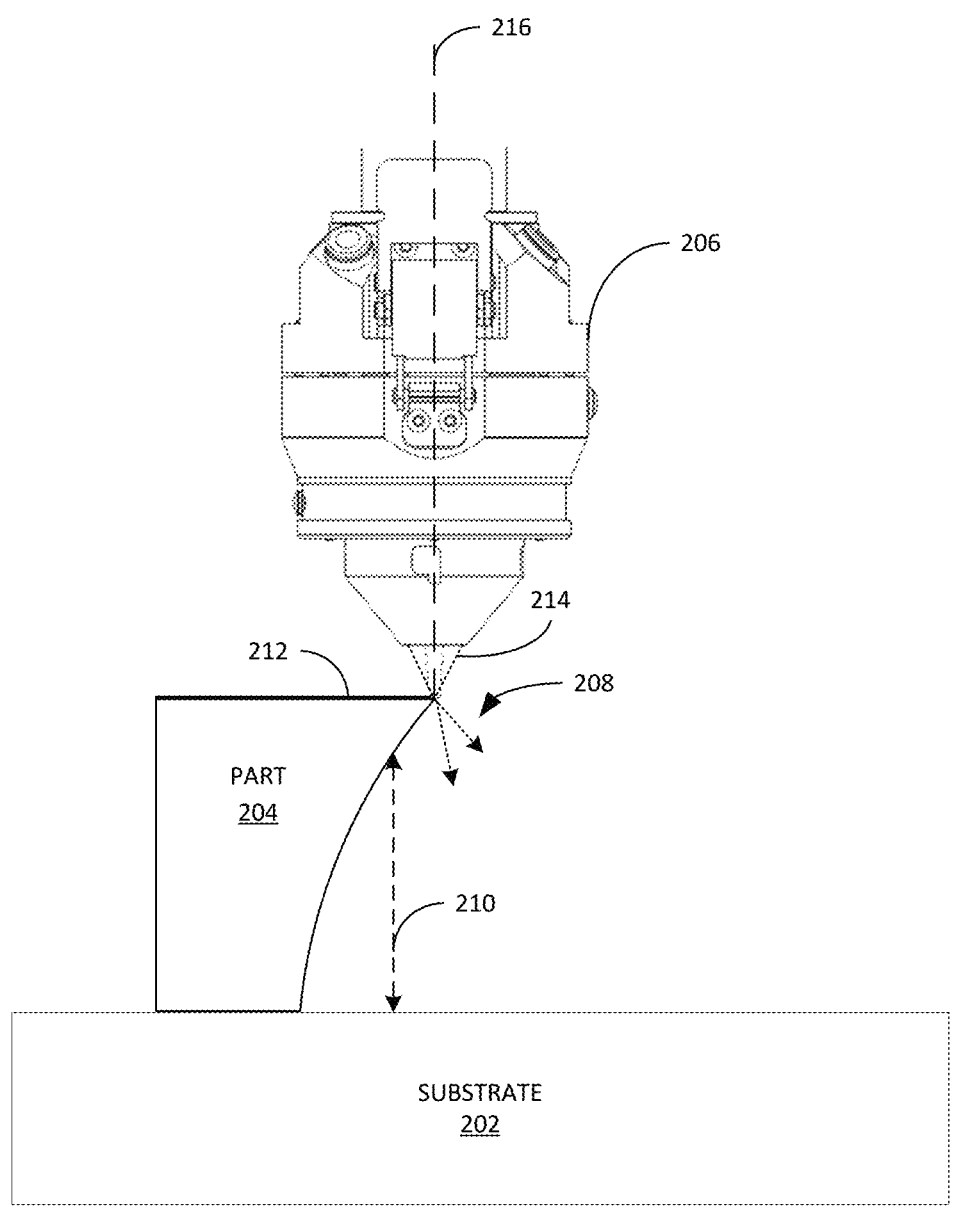
FIG. 2 depicts an example of a directed energy deposition assembly depositing a layer of a part with an overhang.
Figure 2:
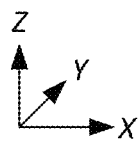

Material delivery system 108 may supply building material, such as a powder or wire, to deposition element 120. In some examples, material delivery system 108 may be a remote reservoir including one or more types of raw material (e.g., different types of metal) to be used by additive manufacturing system 100. Material delivery system 108 may be configured to provide one or more materials simultaneously to deposition element 120, such that hybrid materials (e.g., metal alloys) may be created in party layers 122. FIG. 2 describes an example of a material delivery system that may be used with additive manufacturing system 100.

Deposition element 120 may be connected with material delivery system 108 and may direct material, such as powder, towards a focal point of directed energy beam 134. In this way, material delivery system 108 may help control the amount of material that is additively manufactured at a particular point in time. Deposition element 120 may include nozzles, apertures, and other features for directing material, such as metal powder, towards a manufacturing surface, such as a build surface or previously deposited material layer. In some examples, deposition element 120 may have controllable characteristics, such as controllable nozzle aperture sizes. In some embodiments, deposition element 120 may be a nozzle assembly or deposition head of a directed energy deposition machine, such as a laser metal deposition machine.

Laser metal deposition is a laser-based additive manufacturing process in which metal structures are built up on a substrate or metal layers and structures are applied to existing components (e.g., cladding) in layers. In laser metal deposition, a laser generates a molten bath on an existing surface into which metal powder is directed through a nozzle in a deposition head (e.g., using a carrier gas). The powder melts and bonds with the base material in the molten pool thereby forming new layers and ultimately structures additively.

Gas delivery system 110 may be connected with deposition element 120 to provide propulsive force to the material provided by material delivery system 108, such as by use of carrier gas. In some examples, gas delivery system 110 may modulate the gas flow rate to control material (e.g., powder) flow through deposition element 120 and/or to provide cooling effect during the manufacturing process.

Gas delivery system 110 may include feeds for a plurality of gas flows, such as carrier gas (as described above) as well as shield gas and auxiliary gas flows, such as directed actively cooled gas flows. Gas delivery system 110 may also include feeds for different types of gases so that, for example, different gases may be used for carrier gases, shield gases and auxiliary gases. Gas delivery system 110 may further be configured to provide different gas flows at different rates under the control of control system 104.

Gas delivery system 110 may also be connected with cooling system 132, which may actively cool any of the gas aforementioned gas flows (e.g., carrier, shield, and auxiliary). Cooling system 132 may be configured to apply different amounts of cooling to different gases under the control of control system 104.

Notably, while directed energy source 106, material delivery system 108, gas delivery system 110, sensors 114, sensors 116, directed energy guides 118, and deposition element 120 are shown in an example configuration in FIG. 1, other configurations are possible.

Process motion system 112 may control the positioning of one or more aspects of additive manufacturing system 100, such as sensors 114, sensors 116, and deposition element 120. In some examples, process motion system 112 may be movable in one or more degrees of freedom (e.g., three to six degrees of freedom). For example, process motion system 112 may move and rotate deposition element 120 in and about the X, Y, and Z axes during the manufacturing of part layers 122.

Though not depicted, in various embodiments, process motion system 112 may include cooling elements, such as cooling tubes, fins, channels, lines, and the like. In some embodiments, cooling system 132 may be configured to actively control the temperature of (e.g., to cool) process motion system 112, or parts thereof, such as sensors 114.

Build surface motion system 124 may control the positioning of, for example, a build surface upon which part layers 122 are manufactured. In some examples, build surface motion system 124 may be movable in and about one or more degrees of freedom. For example, build surface motion system 124 may move and rotate the build surface in and about the X, Y, and Z axes during the manufacturing of part layers 122. In some examples, the build surface may be referred to as a build plate or build substrate.

Build surface motion system 124 may also comprise sensors 116, which may include, for example, load sensors, temperature sensors, position sensors, and other sensors that may provide useful information to control system 104. For example, a temperature sensor within build surface motion system may cause control system 104 to increase cooling via cooling system 132, or to decrease power to a directed energy source, and the like.

Though not depicted, in various embodiments, build surface motion system 124 may include cooling elements, such as cooling tubes, fins, channels, and the like. In some embodiments, cooling system 132 may be configured to actively control the temperature of (e.g., to cool) build surface motion system 124, or parts thereof, such as a substrate of build surface motion system 124.

Cooling system 132 may be any sort of active cooling system, such as refrigeration system, a vortex cooler, evaporative gas cooling system, heat pump, and others. Active cooling generally refers to taking an input coolant medium (e.g., fluid or gas) and extracting heat from that coolant medium such that the output coolant medium has a lowered temperature.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may be used to create machine control codes, for example, G-Code, for the control of additive manufacturing system 100. For example, CAM software 128 may create code in order to direct additive manufacturing system 100 to deposit a material layer along a 2D plane, such as a build surface, in order to build or process a part. For example, as shown in FIG. 1, part layers 122 are manufactured on (e.g., deposited on, formed on, processed on, etc.) build surface motion system 124 using process motion system 112 and deposition element 120.

In some examples, one or more of CAD software 126, CAM software 128, and Slicing Software 130 may be combined into a single piece or suite of software. For example, CAD or CAM software may have an integrated slicing function.

Example of Depositing Material on a Part with an Overhang

FIG. 2 depicts an example of aspects of a directed energy deposition assembly 206 depositing a layer 212 of a part 204 with an overhang (as illustrated by the arrow 210). As the overhang starts to reach a more significant angle with respect to the vertical (Z) axis, or the center axis of the deposition element 216 (e.g., a deposition axis), the material 214 being deposited as a new layer 212 of part 204 starts to be deflected away from part 204, as indicated by the arrows at 208. This causes the build quality to suffer, or the build to fail altogether.

Surface Normal Vector, Direction of Travel Vector, and Tool Vector

Figure 3:
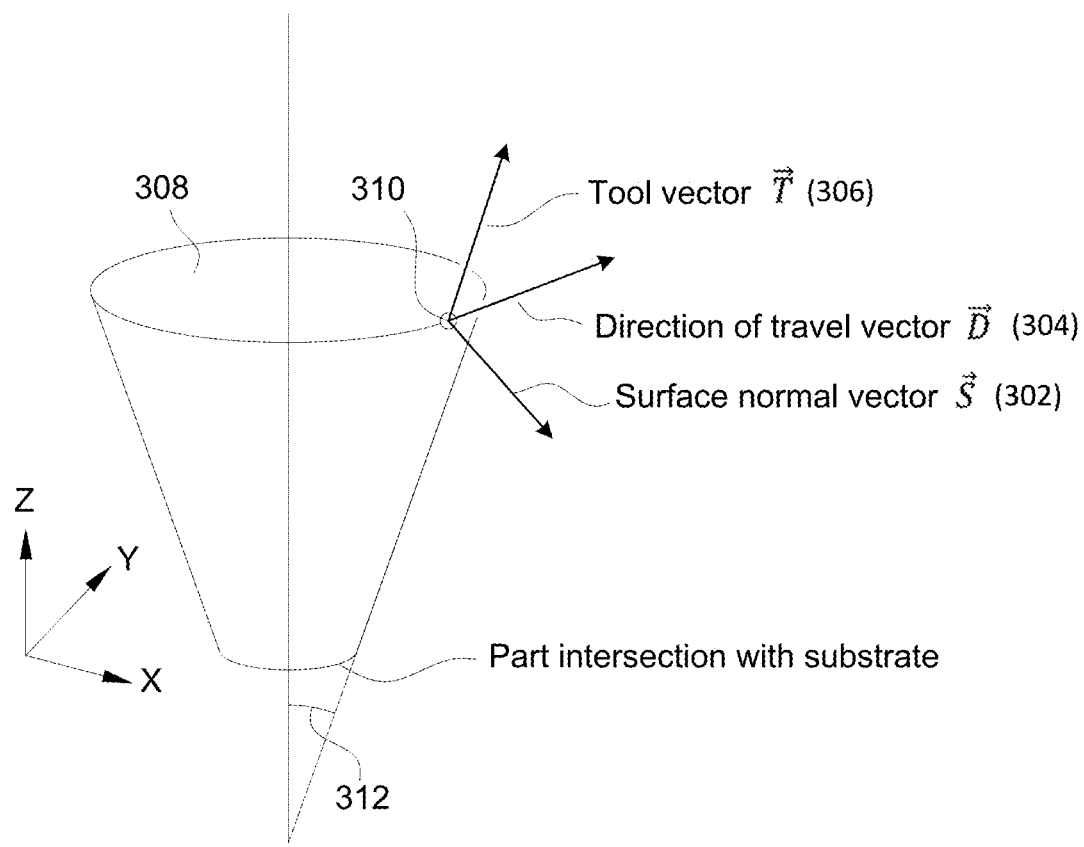
FIG. 3 depicts an example of a surface normal vector, a direction of travel vector, and a tool vector.

FIG. 3 depicts an example of a surface normal vector $\vec{S}$ (302), a direction of travel vector $\vec{D}$ (304), and a tool vector $\vec{T}$ (306). As used herein, a "normal" vector is generally perpendicular to another line, surface, or plane. For example, surface normal vector $\vec{S}$ (302) is normal to the surface of part 308 at point 310, normal to direction of travel vector $\vec{D}$ (304), and normal to tool vector $\vec{T}$ (306).

Further, each of the three vectors shares an origin at point, 310, which in this example is an intended point of deposition, such as a process area (e.g., melt pool) location for a directed energy deposition process, on the top layer of part 308. Point 310 has a three-dimensional coordinate location, e.g., with X, Y, and Z coordinates, which may be a part of a tool path for a deposition tool (not depicted). In this example, the tool is a circle that traverses various {X, Y} coordinates while being constant in Z, which traverses the top layer of the conical frustum shape of part 308.

Tool vector $\vec{T}$ (306) may be used as a reference for orienting a deposition element of an additive manufacturing machine, such as a directed energy deposition machine. Beneficially, by orienting a deposition axis (e.g., 216 in FIG. 2) of the deposition element to align with tool vector $\vec{T}$ (306), the angle 312 of the overhang is effectively neutralized and the problem of deflecting the deposition material (as in the example of FIG. 2) is resolved.

Generally, toolpaths are generated to traverse an entire part layer in order for the layer to be deposited, such as to deposit the next, top-most layer of part 308. A toolpath that is generated based on a surface normal reference at each point along the toolpath (e.g., surface normal vector $\vec{S}$ (302)) may be referred to as a surface normal following toolpath.

Determining Surface Normal Vector Based on Layer Data

Figure 4A:
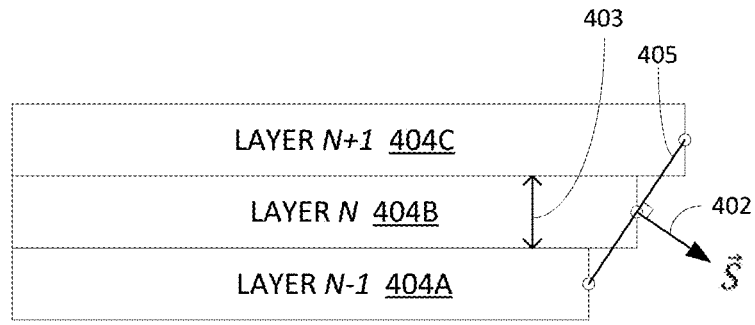
FIGS. 4A-4C depict different examples of determining surface normal vectors based on layer data for a part to be additively manufactured.
Figure 4B:
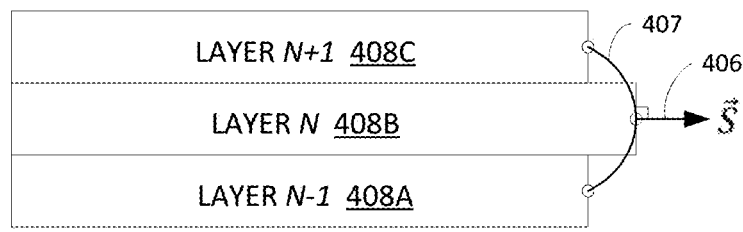
Figure 4C:
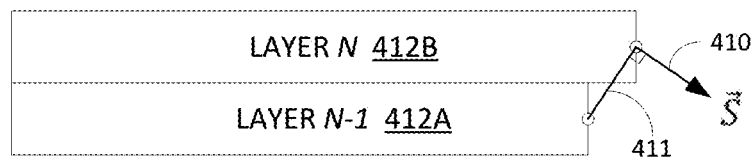

FIGS. 4A-4C depict different examples of determining surface normal vectors based on layer data for a part to be additively manufactured.

As described above, in some embodiments, a control system of an additive manufacturing machine (e.g., 104 of FIG. 1) may determine a surface normal vector based on received layer data, such as from slicing software 130 in FIG. 1.

Layers may generally have some height (e.g., 403 in FIG. 4A) corresponding to the deposition characteristics of the additive manufacturing machine. Because of this, the surface normal vector may be estimated in some embodiments by plotting a line or curve through a plurality of layer height midpoints on the outer surface side of a part, and then determining a surface normal vector $\vec{S}$ at one of the layer height midpoints, such as the layer height midpoint in the middle layer of the reference layers in FIGS. 4A and 4B, or the layer height midpoint of the top reference layer in FIG. 4C.

For example, FIG. 4A depicts an example of layer data for three layers 404A-C of a part, where the middle layer is labeled layer N, the layer below is labeled layer N−1, and the layer above is labeled N+1. A line 405 is drawn through the layer height midpoint of each layer, and a surface normal vector $\vec{S}$ (402) is determined at the height midpoint of layer 404B, where arrow 403 indicates the height of layer 404B.

FIG. 4B depicts another example of layer data for three layers 408A-C of a part, where again the middle layer is labeled layer N, the layer below is labeled layer N−1, and the layer above is labeled N+1. Here, the outer surface shape of the part is such that a curve 407 is drawn through the height midpoint of each layer (408A-C), and a surface normal vector $\vec{S}$ (406) is determined at the height midpoint of layer 408B.

FIG. 4C depicts yet another example of layer data for two layers 412A-B of a part, where the top layer is labeled layer N and the layer below is labeled layer N−1. This example may be useful where, for example, a top surface of a part is reached and there is not another layer above. For example, here, layer 412B may be the top surface of the part, in which case there is no layer N+1. In this case, a line may be drawn between the height midpoints of layers 412A and 412B and a surface normal may be determined based on the line. In this example, the surface normal 410 is set to emanate from the midpoint of the top layer, which is 412B in this example.

Note that in examples of FIGS. 4A-4C, the midpoint of the height of each layer was used as a reference for determining a reference line for the surface normal vector. However, in other embodiments, other reference positions may be used. This is merely one example.

Kinematic Transformation

A kinematic transformation is a function that may be used to describe mechanical behavior as it appears from a different frame of reference. Kinematic transformation may be used, for example, to determine the position (e.g., Cartesian coordinates) and orientation of the end-point of a machine controllable element, like a deposition element of a directed energy deposition system. By extension, the location of an active processing area created by the deposition element on a build surface can be determined with kinematic transformation.

Figure 5:
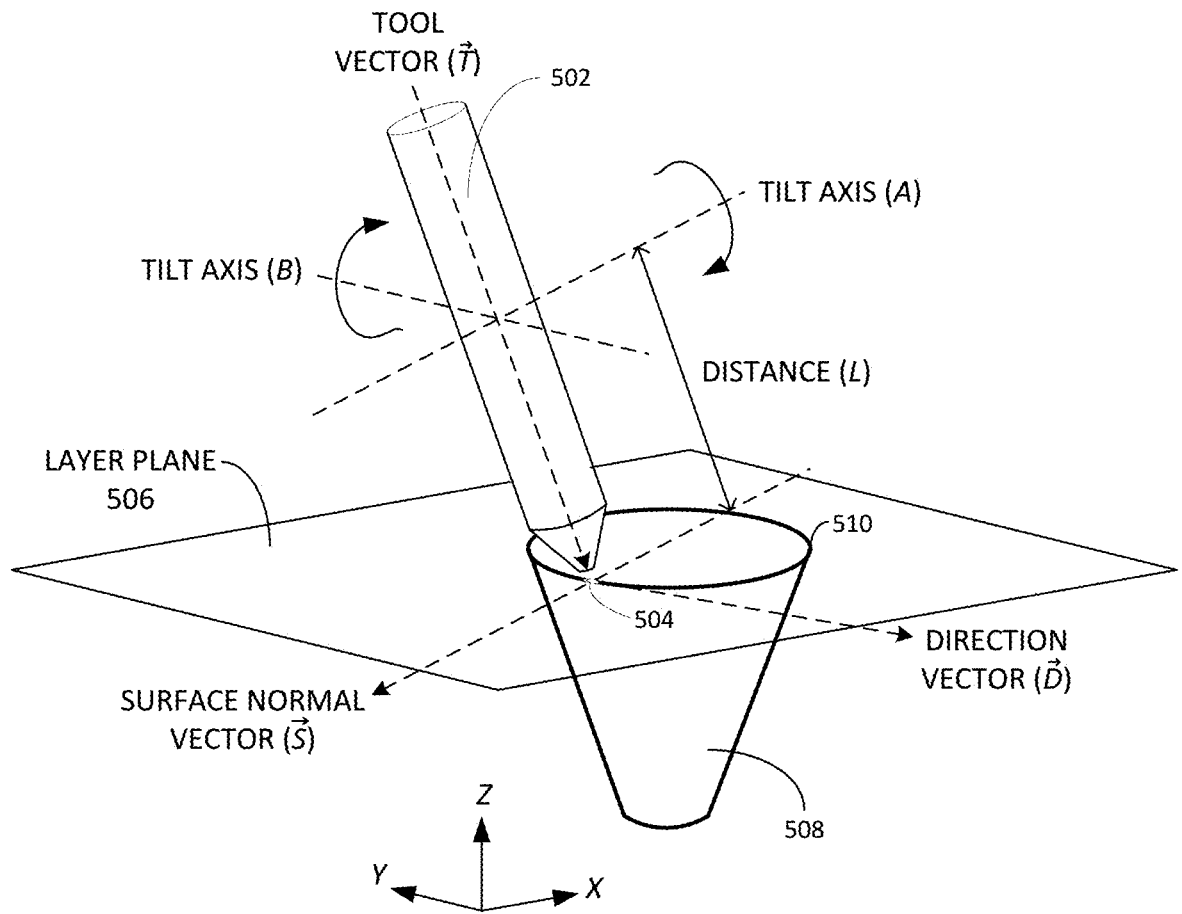
FIG. 5 depicts an example of determining a kinematic transformation for a deposition assembly.

FIG. 5 depicts an example of an orientation of a deposition assembly 502 that is depositing material (e.g., as a layer of part 508) at process area 504. In some embodiments, process area 504 may be a melt pool formed by a directed energy deposition system, such as described with respect to FIG. 1.

In order to orient deposition assembly 502 so that it aligns with a tool vector, such as described above with respect to FIG. 3, a kinematic transformation may be determined. For example, consider that γ is the angle of the tool vector $\vec{T}$ with respect to the X/Y plane (or build plane 506), which in this example is coincident with the layer 510 being deposited. Further, consider that α is the angle of a direction of travel vector $\vec{D}$ and L is the distance between the tilt axis A and process area 504. Further yet, Δx, Δy, and Δz are the offsets in the X-axis, Y-axis, and Z-axis, respectively, for maintaining the center point of deposition assembly 502, when rotating around tile axis A and/or B. These offsets thus maintain the proper location of process area 504. Then it is possible to derive the following kinematic transformations:

Tilt Axis $B=\tan^{-1}[\cos(\alpha)\tan(\gamma)]$

Tilt Axis $A=\tan^{-1}[-\sin(\alpha)\tan(\gamma)\cos(B)]$ $\Delta x = L \sin(B)$ $\Delta y = -L \cos(B)\sin(A)$ $\Delta z = L[\cos(\gamma)-1]$ These kinematic transformations can then be used to control the orientation of deposition assembly 502. For example, where a surface normal following toolpath is generated according to a tool vector, as described above, these kinematic transformations may be used to position movable parts of the additive manufacturing machine to align deposition assembly 502 appropriately. In this way, the deposition assembly can perform a "surface normal following" strategy when depositing layers, which overcomes the overhang issue described above with respect to FIG. 3.

Note that the preceding kinematic transformations are just one example as depicted in FIG. 5, and many other mechanical implementations are possible, which may have different kinematic transformation equations. For example, in other implementations, more or fewer degrees of freedom may be available to position deposition assembly 502. Further, rotation limits may be necessary to avoid, for example, entangling hoses, connections, and the like.

Moreover, while FIG. 5 depicts an example of planar slicing of a part layer (e.g., layer plane 506 with layer 510), the methods described herein are equally applicable to non-planar layer data. For example, where a part already exists and is modeled, directed energy deposition may be used to build the part up, or clad it, or the like. In such cases, non-planar layers may be based on the underlying shape and/or contours of the existing part. In such cases, a surface normal following toolpath may move in X, Y, and Z dimensions. The examples described herein are meant for clarity and ease of description and are not intended to suggest that the methods described herein are limited in application to planar layer data.

Figure 6:
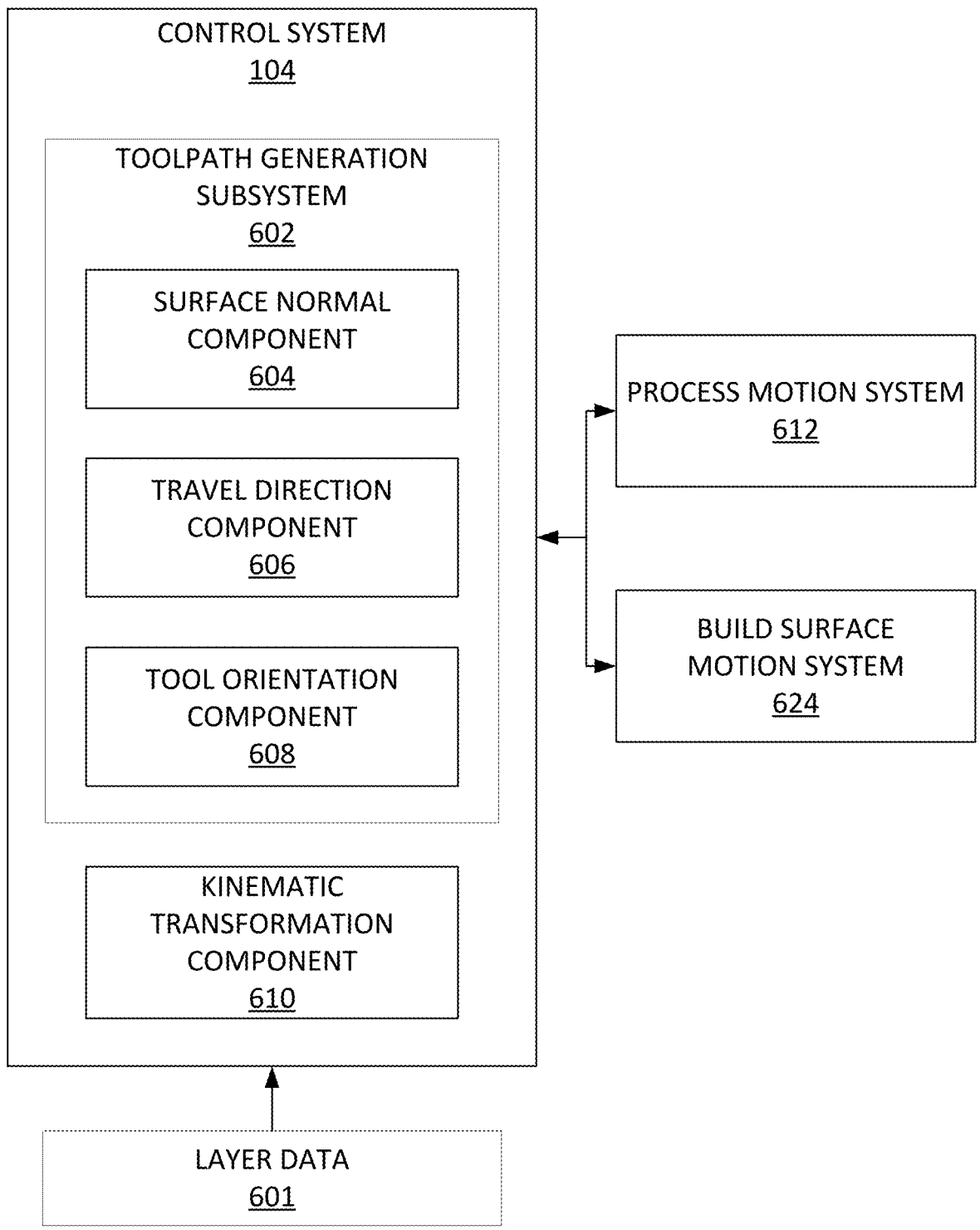
FIG. 6 depicts an example of a control system configured for generating multi-axis toolpaths based on a surface normal reference.

Example Control System with Surface Normal-Based Tool Path Generation Component FIG. 6 depicts an example of a control system, such as 104 of FIG. 1, configured for generating multi-axis toolpaths based on a surface normal reference.

In particular, control system 104 includes toolpath generation subsystem 602, which includes surface normal determination component 604, travel direction determination component 606, and tool orientation determination component 608.

Surface normal determination component 604 may generally be configured to determine surface normal references (e.g., surface normal vector $\vec{S}$ (302) in FIG. 3) based on layer data 601 for a part to be additively manufactured. In some embodiments, the surface normal reference may be determined in the manner described above with respect to FIGS. 4A-4C.

In other embodiments, surface normal determination component 604 may receive the surface normal references in data received from, for example, a CAM or slicing software (e.g., 128 and 130 of FIG. 1, respectively) as part of layer data 601. For example, a slicing component may provide data tuples to surface normal determination component 604 as part of layer data 601, which include multi-dimensional coordinates (e.g., Cartesian coordinates for X, Y, and Z axes) as well as a surface normal reference for each set of coordinates. A data tuple may be, for example, {X-coordinate, Y-coordinate, Z-coordinate, surface normal reference description}. The surface normal reference description may be, for example, a description of a vector emanating from the X, Y, and Z coordinates, which is normal to the surface of the part at that coordinate position. The description may include reference angles of the vector, such as inclination angle and rotation angle, in some embodiments.

Travel direction component 606 may generally be configured to determine travel direction references (e.g., direction of travel vector $\vec{D}$ (304) in FIG. 3) based on layer data 601 for a part to be additively manufactured. In some embodiments, the travel direction reference may be determined based on at least two sequential positions along a layer or toolpath (e.g., positions $\{X_n, Y_n, Z_n\}$ and $\{X_{n+1}, Y_{n+1}, Z_{n+1}\}$), where the change between the first position and the second position determines the travel direction. This is just one example, and others are possible.

As with the surface normal reference, in some embodiments the travel direction reference may be received as part of layer data 601 from, for example, the CAM or slicing software. As above, it may be provided as a data tuple, which may or may not also include the surface normal reference component. For example, a data tuple may include {X-coordinate, Y-coordinate, Z-coordinate, travel direction reference description} or {X-coordinate, Y-coordinate, Z-coordinate, surface normal reference description, travel direction reference description}. The travel direction reference description may be, for example, a description of a vector emanating from the X, Y, and Z coordinates, which is tangent to the surface of the part at that coordinate position and normal to the surface normal vector.

Tool orientation component 608 may generally be configured to determine tool orientation references (e.g., tool vector $\vec{T}$ (306) in FIG. 3) based on the surface normal references and travel direction references described above. For example, for a given position along a layer or toolpath, the tool orientation reference may be determined as a vector that is normal to both the travel direction reference and the surface normal reference for the given position. Additionally, the tool orientation reference may be chosen based on a direction in which the part has not yet been built. For example, as depicted in FIG. 3, the tool vector 306 emanates away from the already built portion of part 308.

Toolpath generation subsystem 602 may thus generate surface normal following multi-axis toolpaths based on layer data 601 and the references generated by components 604, 606, and 608. The surface normal following multi-axis toolpaths may then be provided to kinematic transformation component 610. Kinematic transformation component 610 may, in-turn, determine the kinematic commands necessary to orient a tool, such as a deposition element, of the additive manufacturing machine in alignment with the tool orientation reference. For example, the commands may be provided to process motion system 612 and/or build motion system 624 as part of a surface normal following multi-axis toolpath in order to arrange the deposition element such that its deposition axis is aligned with the tool orientation reference (e.g., tool vector $\vec{T}$ (306) in FIG. 3).

Further, kinematic transformation component may account for optimal working distance between a deposition element and the build surface to maintain build quality. For example, the distance between a deposition element (e.g., nozzle) of a directed energy deposition machine and a process area (e.g., melt pool) may be accounted for by the kinematic transformation.

Note that while surface normal component 604, travel direction component 606, and tool orientation component 608 are depicted as components of toolpath generation subsystem 602, which is a part of control system 104 that also includes kinematic transformation component 610 in this example, in other embodiments, these various aspects may be configured independently or differently. Similarly, toolpath generation subsystem 602 may be a standalone system in other embodiments. The arrangement of FIG. 6 is just one example embodiment.

Figure 7:
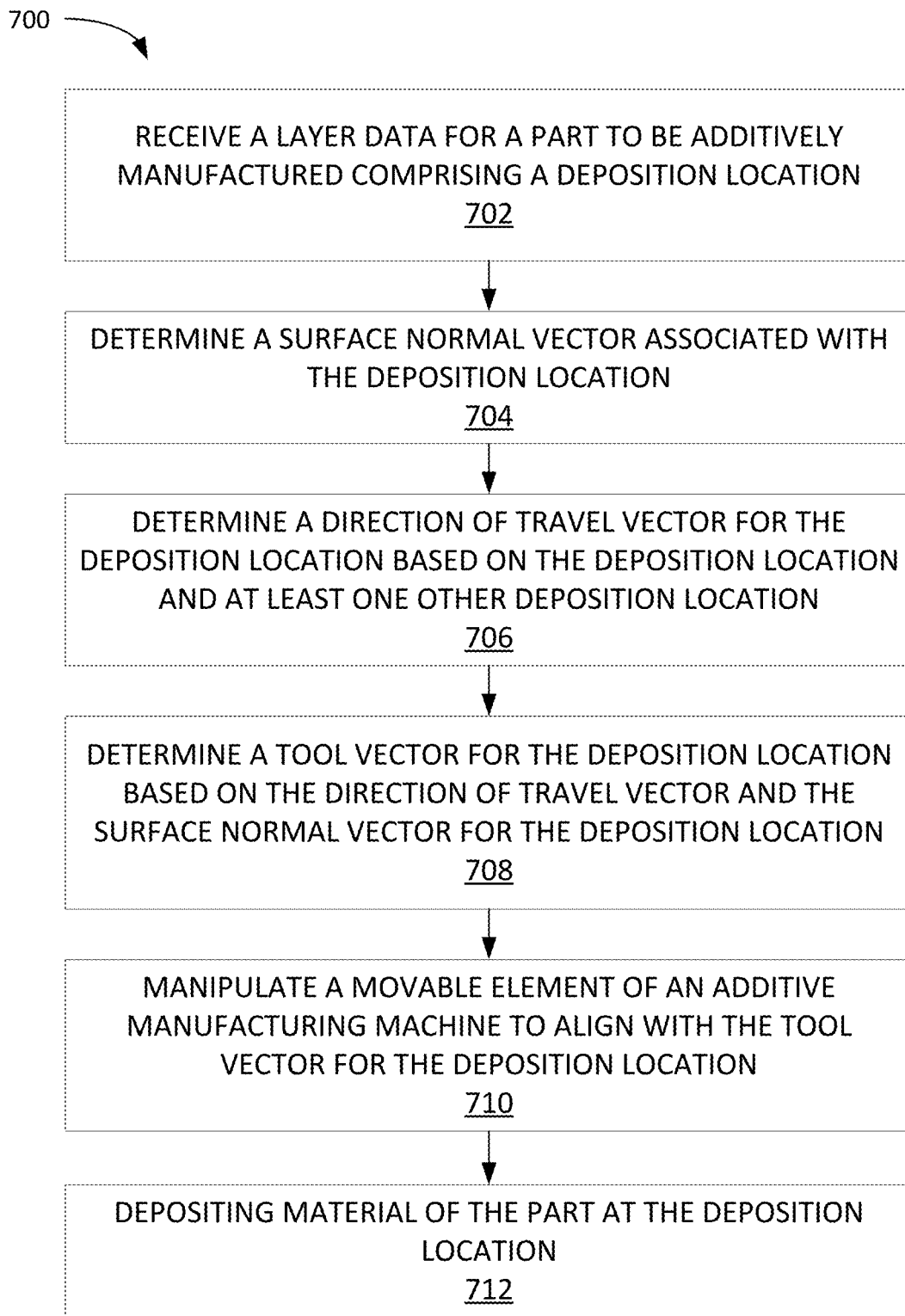
FIG. 7 depicts an example method for additive manufacturing according to a surface normal reference.

Example Method for Additive Manufacturing According to a Surface Normal Reference FIG. 7 depicts an example method 700 for additive manufacturing according to a surface normal reference.

Method 700 begins at step 702 with receiving layer data for a part to be additively manufactured comprising a deposition location. In various embodiments, the layer data may comprise any number of deposition locations.

Method 700 then proceeds to step 704 with determining a surface normal vector for the deposition location. For example, the surface normal vector (e.g., surface normal vector $\vec{S}$ (302) in FIG. 3) may be determined according the methods described with respect to FIGS. 4A-4C, or by other methods.

In some embodiments, determining the surface normal vector for the deposition location comprises receiving the surface normal vector for the deposition location as part of the layer data. For example, as described above, the surface normal vector may be include as part of a data tuple with the coordinates of the deposition location.

In some embodiments, the surface normal vector for the deposition location is normal to an outer part surface and coincident with the deposition location, such as depicted in FIG. 3.

Method 700 then proceeds to step 706 with determining a direction of travel vector (e.g., direction of travel vector $\vec{D}$ (304) in FIG. 3) based on the deposition location and at least one other deposition location (e.g., another deposition location of the layer data).

In some embodiments of method 700, the direction of travel vector for the deposition location is normal to the surface normal vector for the deposition location, coincident with the deposition location, and tangent to a surface of the part at the deposition location, such as depicted in FIG. 3. Further, the direction of travel vector for the deposition location may be parallel to a build surface for the part.

Method 700 then proceeds to step 708 with determining a tool vector (e.g., tool vector $\vec{T}$ (306) in FIG. 3) for the deposition location based on the direction of travel vector and the surface normal vector for with the deposition location.

In some embodiment of method 700, the tool vector for the deposition location is normal to the surface normal vector for the deposition location, coincident with the deposition location, and normal to the direction of travel vector for the respective deposition location, such as depicted in FIG. 3.

Method 700 then proceeds to step 710 with manipulating a movable element of the additive manufacturing machine to align with the tool vector for the respective deposition location. In some embodiments, the movable element of the additive manufacturing machine comprises a deposition element. In some embodiments, the movable element of the additive manufacturing machine comprises a build surface.

In some embodiments, both a deposition element and a build surface are manipulated based on the tool vector. For example, where the angle achievable for a deposition element is limited, the build surface may also be moved in order to generate a large effective angle for the deposition element.

In some embodiments, manipulating the movable element of the additive manufacturing machine to align with the tool vector comprises performing a kinematic transformation by a control system of the additive manufacturing machine, such as described with respect to FIG. 5. In some embodiments, the transformation is a function of the surface normal vector and direction of travel vector.

In some embodiments, the surface normal vector, direction of travel vector, and tool vector are used to generate a tool path location for a multi-axis surface normal following toolpath, which may be used by the additive manufacturing machine to guide the depositing of a layer of a part.

Method 700 then proceeds to step 712 with depositing material of the part at the deposition location.

Method 700 may generally be performed repeatedly or iteratively for any number of deposition locations in a tool path, and for any number of tool paths associated with part layers in a part model.

In some embodiments, method 700 further includes manipulating a build surface prior to depositing material of the part at the respective deposition location. For example, build surface motion system 124 of FIG. 1 may be used to manipulate the build surface.

Notably, FIG. 7 is just one example method, and other methods having additional steps, different steps, and/or fewer steps are possible consistent with the various embodiments described herein.

Example Clauses

Clause 1: A method for operating an additive manufacturing machine, comprising: receiving layer data for a part to be additively manufactured, wherein the layer data comprises a plurality of deposition locations; for each respective deposition location of the plurality of deposition locations: determining a surface normal vector for with the respective deposition location; determining a direction of travel vector based on the respective deposition location and at least one other deposition location of the plurality of deposition locations; determining a tool vector for the respective deposition location based on the direction of travel vector for the respective deposition location and the surface normal vector for with the respective deposition location; manipulating a movable element of the additive manufacturing machine to align with the tool vector for the respective deposition location; and depositing material of the part at the respective deposition location.

Clause 2: The method of Clause 1, wherein determining the surface normal vector for the respective deposition location comprises receiving the surface normal vector as part of the layer data.

Clause 3: The method of any one of Clauses 1-2, wherein for each respective deposition location of the plurality of deposition locations, the tool vector for the respective deposition location is perpendicular to both the direction of travel vector for the respective deposition location and the surface normal vector for the respective deposition location.

Clause 4: The method of any one of Clauses 1-3, wherein: manipulating a movable element of the additive manufacturing machine to align with the tool vector comprises performing a kinematic transformation by the control system of the additive manufacturing machine, and the transformation is a function of the surface normal vector and direction of travel vector.

Clause 5: The method of any one of Clauses 1-4, further comprising, for at least one respective deposition location of the plurality of deposition locations, manipulating a build surface prior to depositing material of the part at the respective deposition location.

Clause 6: The method of any one of Clauses 1-5, wherein each direction of travel vector for each respective deposition location is normal to the surface normal vector for the respective deposition location, coincident with the deposition location, and tangent to a surface of the part at the respective deposition location.

Clause 7: The method of Clause 6, wherein each direction of travel vector for each deposition location is parallel to a build surface for the part at the deposition location.

Clause 8: The method of any one of Clauses 1-7, wherein each tool vector for each respective deposition location is normal to the surface normal vector for the respective deposition location, coincident with the deposition location, and normal to the direction of travel vector for the respective deposition location.

Clause 9: The method of any one of Clauses 1-8, wherein the movable element of the additive manufacturing machine comprises a deposition element.

Clause 10: The method of any one of Clauses 1-8, wherein the movable element of the additive manufacturing machine comprises a build surface.

Clause 11: A processing system, comprising: a memory comprising computer-executable instructions; one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for operating an additive manufacturing machine, comprising:
    receiving layer data for a part to be additively manufactured, wherein the layer data comprises a plurality of deposition locations;
    for each respective deposition location of the plurality of deposition locations:
        determining a surface normal vector for with the respective deposition location;
        determining a direction of travel vector based on the respective deposition location and at least one other deposition location of the plurality of deposition locations;
        determining a tool vector for the respective deposition location based on the direction of travel vector for the respective deposition location and the surface normal vector for with the respective deposition location;
        manipulating a movable element of the additive manufacturing machine to align with the tool vector for the respective deposition location; and
        depositing material of the part at the respective deposition location.

2. The method of claim 1, wherein determining the surface normal vector for the respective deposition location comprises receiving the surface normal vector as part of the layer data.

3. The method of claim 1, wherein for each respective deposition location of the plurality of deposition locations, the tool vector for the respective deposition location is perpendicular to both the direction of travel vector for the respective deposition location and the surface normal vector for the respective deposition location.

4. The method of claim 1, wherein:
manipulating a movable element of the additive manufacturing machine to align with the tool vector comprises performing a kinematic transformation by the control system of the additive manufacturing machine, and
the transformation is a function of the surface normal vector and direction of travel vector.

5. The method of claim 1, further comprising, for at least one respective deposition location of the plurality of deposition locations, manipulating a build surface prior to depositing material of the part at the respective deposition location.

6. The method of claim 1, wherein each direction of travel vector for each respective deposition location is normal to the surface normal vector for the respective deposition location, coincident with the deposition location, and tangent to a surface of the part at the respective deposition location.

7. The method of claim 6, wherein each direction of travel vector for each deposition location is parallel to a build surface for the part at the deposition location.

8. The method of claim 1, wherein each tool vector for each respective deposition location is normal to the surface normal vector for the respective deposition location, coincident with the deposition location, and normal to the direction of travel vector for the respective deposition location.

9. The method of claim 1, wherein the movable element of the additive manufacturing machine comprises a deposition element.

10. The method of claim 1, wherein the movable element of the additive manufacturing machine comprises a build surface.

11. An processing system, comprising:
a memory comprising computer-executable instructions;
a processor configured to execute the computer-executable instructions and cause the processing system to:
receive layer data for a part to be additively manufactured, wherein the layer data comprises a plurality of deposition locations;
for each respective deposition location of the plurality of deposition locations:
determine a surface normal vector for with the respective deposition location;
determine a direction of travel vector based on the respective deposition location and at least one other deposition location of the plurality of deposition locations;
determine a tool vector for the respective deposition location based on the direction of travel vector for the respective deposition location and the surface normal vector for with the respective deposition location;
manipulate a movable element of an additive manufacturing machine to align with the tool vector for the respective deposition location; and
deposit material of the part at the respective deposition location.

12. The processing system of claim 11, wherein in order to determine the surface normal vector for the respective deposition location, the processor is further configured to cause the processing system to receive the surface normal vector as part of the layer data.

13. The processing system of claim 11, wherein for each respective deposition location of the plurality of deposition locations, the tool vector for the respective deposition location is perpendicular to both the direction of travel vector for the respective deposition location and the surface normal vector for the respective deposition location.

14. The processing system of claim 11, wherein:
in order to manipulate a movable element of the additive manufacturing machine to align with the tool vector, the processor is further configured to cause the processing system to perform a kinematic transformation, and
the transformation is a function of the surface normal vector and direction of travel vector.

15. The processing system of claim 11, wherein the processor is further configured to cause the processing system to, for at least one respective deposition location of the plurality of deposition locations, manipulate a build surface prior to depositing material of the part at the respective deposition location.

16. The processing system of claim 11, wherein each direction of travel vector for each respective deposition location is normal to the surface normal vector for the respective deposition location, coincident with the deposition location, and tangent to a surface of the part at the respective deposition location.

17. The processing system of claim 16, wherein each direction of travel vector for each deposition location is parallel to a build surface for the part at the deposition location.

18. The processing system of claim 11, wherein each tool vector for each respective deposition location is normal to the surface normal vector for the respective deposition location, coincident with the deposition location, and normal to the direction of travel vector for the respective deposition location.

19. The processing system of claim 1, wherein the movable element of the additive manufacturing machine comprises a deposition element.

20. The processing system of claim 1, wherein the movable element of the additive manufacturing machine comprises a build surface.

* * * * *